Dec. 20, 1932.         T. R. THOMAS         1,891,459
STEERING KNUCKLE LUBRICATION
Original Filed Sept. 28, 1925    2 Sheets-Sheet 2
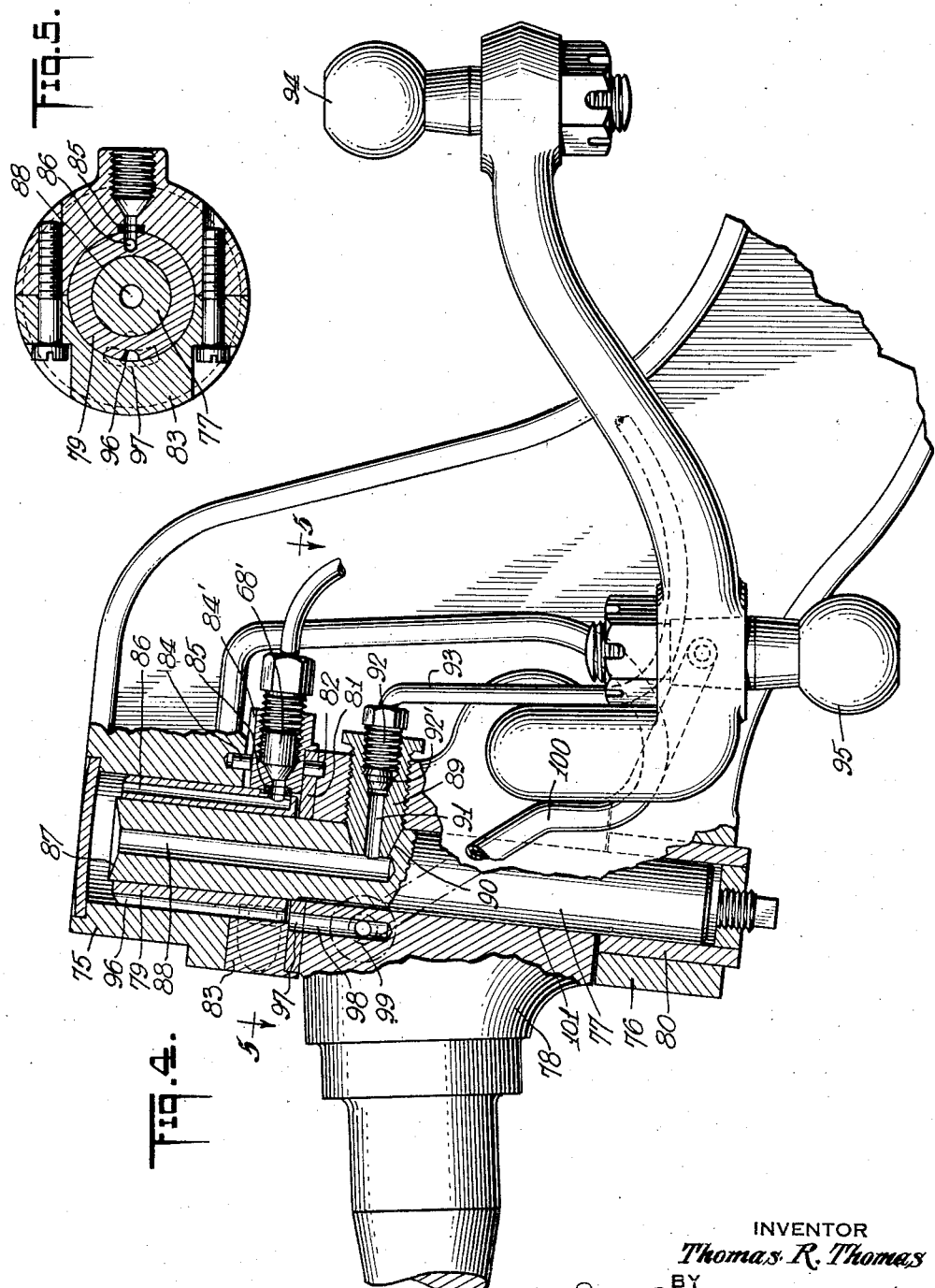
INVENTOR
Thomas R. Thomas
BY
his ATTORNEYS Patented Dec. 20, 1932

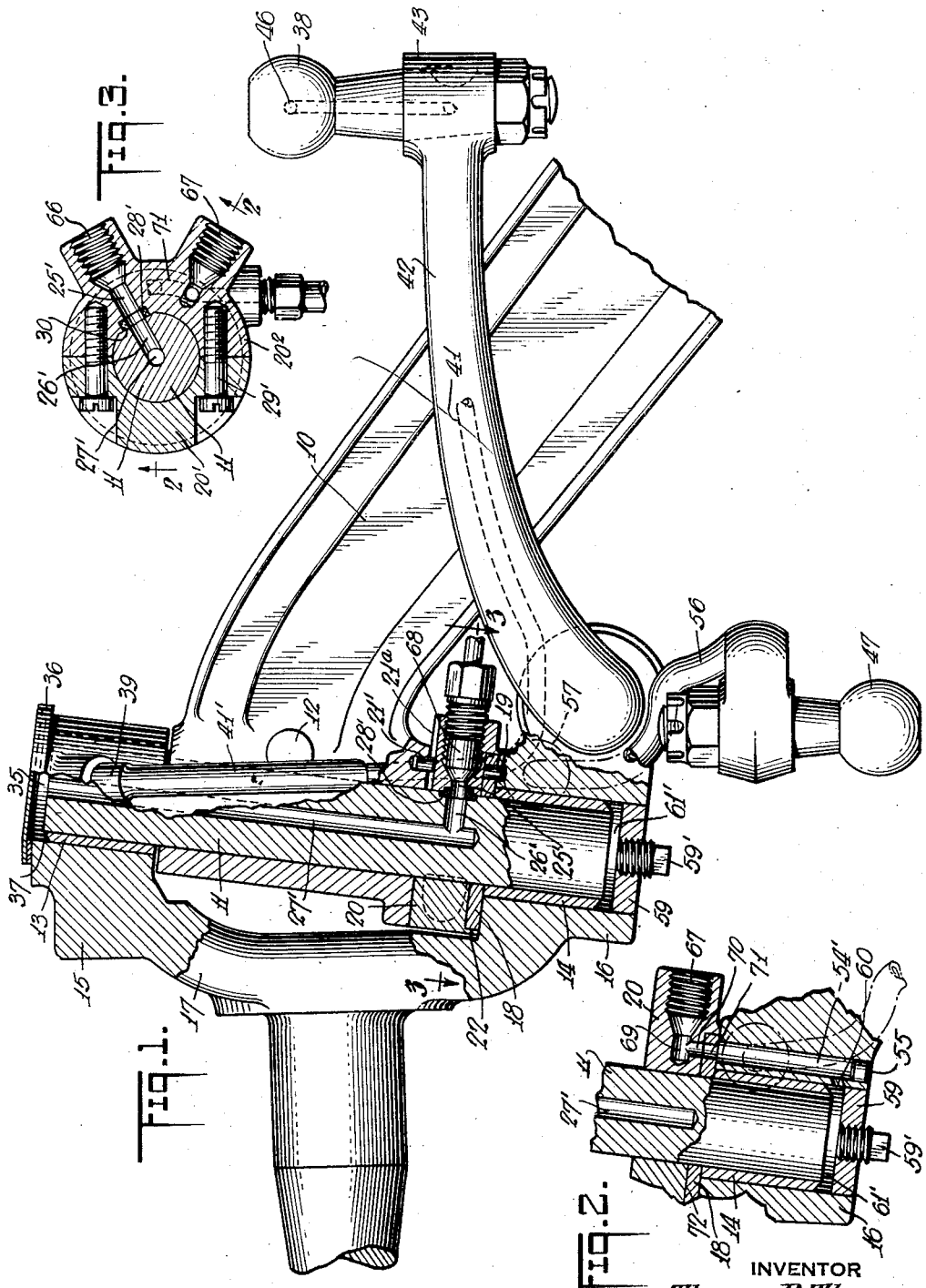

1,891,459

UNITED STATES PATENT OFFICE

THOMAS R. THOMAS, OF NEWARK, NEW JERSEY, ASSIGNOR TO AUTO RESEARCH CORPORATION, A CORPORATION OF DELAWARE

STEERING KNUCKLE LUBRICATION

Original application filed September 28, 1925, Serial No. 59,002. Divided and this application filed June 8, 1929. Serial No. 369,398.

My present invention is concerned with gravity flow systems and has a preferred application in association with pressure lubricating systems, more particularly for delivering lubricant by gravity flow from a pressure line to the bearing or bearings of a structure having a swiveled or other movable connection to the structure carrying the pressure line, and especially where it is undesirable to convey the lubricant under pressure past or across such swivel or other connection.

The invention has a preferred application to the lubrication of the steering knuckles of a motor vehicle and the broad object of delivering lubricant reliably to various knuckle bearings and without the need for selective manipulation, nor the use of auxiliary swivels or of flapping conduits or other parts likely to become damaged in use, and which will, moreover, preclude the entry of dust to the bearing surfaces.

Among the more specific objects of the invention are to apply a lubricating installation of the character set forth to an axle and knuckle construction, differing from types heretofore in common use, substantially only in added machining operations, such as providing bores in the standard parts thereof, so that dies already in use for forging such axles and knuckles can be used further without substantial modification thereof for production of axles lubricated according to the invention.

The objects are attained broadly by an arrangement in which the lubricant inlet for the knuckle is fixed neither directly into the axle nor into the knuckle, but disposed adjacent the king pin or other knuckle pivot axis on a suitable sustaining member therefor lodged in a space between the knuckle and axle and keyed to the latter.

In a preferred embodiment of the invention, I substitute for the usual knuckle thrust bearing, one of the same contour, comprising a thrust disk on the knuckle and a thrust block of greater thickness rigid with the axle. The lubricant from the axle is admitted through the thrust block fixed thereto, whence it passes to the knuckle bearings. In one embodiment, the lubricant admitted through the thrust block is delivered upwardly through a corresponding passage carried as a rigid part of the axle to the upper end of the knuckle, whence the lubricant flows by gravity downward along the structure of the knuckle through corresponding conduits to the knuckle bearings to be lubricated.

In another embodiment, some of the lubricant from the thrust block is fed downward preferably through the thrust disk to the knuckle construction for lubricating the lowermost bearing or bearings carried on the knuckle. The lubricant inlet may be a single drip plug or inlet fitting for supplying lubricant to all of the bearings or two or more such drip plugs may be provided in the thrust block, each conveying lubricant through separate and distinct conduits to different bearings of the knuckle.

The present application is a division of my copending application Serial No. 59,002 filed September 28th, 1925 which was issued February 25, 1930 as Patent No. 1,748,924 and is particularly concerned with the specific structure shown in Figs. 4 to 8 of said application but claimed therein only generically.

In the accompanying drawings in which are shown one or more of various possible embodiments of the several features of the invention.

Fig. 1 is a side view partly in section of one embodiment of lubricated knuckle.

Fig. 2 is a fragmentary sectional detail view of the lower end of Fig. 1, taken along the line 2—2 of Fig. 3;

Fig. 3 is a sectional view taken along the line 3—3 of Fig. 1.

Fig. 4 is a view similar to Fig. 1 of another embodiment, and;

Fig. 5 is a transverse sectional view taken along the line 5—5 of Fig. 4.

Referring now to Figs. 1 to 3 of the drawings, I have shown an axle beam 10, through the eye of which extends a king pin 11 secured thereto by cross key 12 and bearing at its ends in bushings 13 and 14 in clevis jaws 15 and 16 respectively of the knuckle 17. Clevis jaw 16 is closed at its lower end by a plug 59 below the lower end of the king pin, said plug having a screw plug 59' therein removable to permit access to the lower end of the king pin for pushing out the latter. In the conventional construction thus far described, the eye of the beam is of a length substantially less than the distance between the clevis jaws of the knuckle to provide space for a thrust bearing interposed between the lower clevis jaw and the lower end of the eye of the axle beam.

In the present embodiment, I have substituted for the usual ball thrust bearing, a thrust bearing construction of corresponding external configuration, but of the plate type which comprises a disk 18 resting on the lower clevis jaw and having a pin 19 fixed therein and in a corresponding opening in the clevis jaw to maintain the disk from rocking therewith. Upon the disk is a thrust block 20 of greater thickness, provided with a radial groove 21a in the upper face thereof, into which extends a pin 21' press-fitted in a corresponding depression in the lower face of the axle beam and serving to key the thrust block to the axle beam. The thrust disk and the thrust block determine a thrust bearing surface therebetween from which dust is effectively excluded by an integral skirt 22 on the block, snugly encircling a substantial part of the thickness of the disk 18.

The thrust block is here employed also for admission of lubricant to the bearings, preferably from a centralized lubricating system on the motor vehicle, which simultaneously serves a multiplicity of chassis bearings thereon. For this purpose, I have shown the thrust block provided with a pair of unitary lateral extension sockets 66 and 67 thereon protruding toward the axle beam. An appropriate inlet such as a drip plug 68 of the type shown in the copending application of Edward H. Kocher, Serial No. 22,104 filed April 10, 1925 may be provided in each socket and fed from the central source of pressure. The socket 66 communicates with a port 25' radially through the thrust block aligned with and delivering into a radial bore 26' in the king pin 11, the latter bore communicating with an axial bore 27' from the top of the king pin to below said radial bore.

To maintain a lubricant-tight joint between the thrust block and the king pin, so that lubricant passed from the inlet fitting will flow without loss into the king pin, I provide the construction best shown in Fig. 3. A small annular gasket 28' is disposed in a countersink in the inner end of the bore 25' in the thrust block and said thrust block is split into the two segments 20' and 20² tightly clamped together by screws 29' to cause said segments to grip the king pin firmly and thereby to compress the gasket tightly into the socket and against the king pin. For more effective tightness, the king pin is flattened as at 30 in the region of the gasket, which is thus not distorted out of its plane but merely compressed in the assembly. The gasket will, accordingly, be effectively compressed without injury thereto, a result that could be accomplished only with difficulty, if at all, were the gasket placed in a unitary thrust block and the king pin driven therethrough for friction fit.

Lubricant that has passed the upper end of the king pin bore spreads in the cavity 35 thereabove, which is sealed by the cap 36 on the knuckle and such lubricant will in part seep between the king pin and the bushing 13 to lubricate that bearing, the rest passing about the bevelled upper edge 37 of the bushing for transmission to the drag link bearing 38. For this purpose, a short tube (not shown) is frictionally-fitted into an oblique bore in the upper knuckle clevis 15 and a pipe 41' friction-fitted over the protruding end of said tube 39 extends downward therefrom to and along the drag link arm 42 to the eye 43 of the corresponding bearing, all in a manner more clearly disclosed in the parent application Serial No. 59,002. As in the disclosure of the said parent application, the internal diameter of the pipe 41 down to at least the level of the ball outlet, may be sufficiently large as appears at 41' to permit passage of lubricant about any air therein, thereby precluding air blocking, the conduit below said level in which lubricant becomes trapped since it extends below the outlet 46 being, if desired, of smaller diameter, as shown.

The inlet fitting in socket 67 supplies lubricant to the thrust bearing, to the lower king pin and to the tie rod bearings. The socket 67 to this end is provided with a cavity 69 of reduced diameter therebeyond, communicating with a vertical bore 70 leading to the thrust face 72 of the thrust block, which, in turn, communicates with a slot 71 in the thrust disk 18, said slot made arcuate so as to register with the bore 70 in all positions of the knuckle. The slot 71 communicates with a longitudinal bore 54' in the lower clevis jaw of the knuckle, which is plugged at its lower end at 55. A pipe 56 is secured by an appropriate terminal 57 to the knuckle, said pipe extending generally along the structure of the knuckle or along the tie rod arm and delivering to the tie rod ball stud 47 which may be provided with a system of bores (not shown). Immediately above the plug 59 a small port 60 is bored to establish communication between the bore 54' and the small well 61' between the lower end of the king pin and the plug 59.

In operation, when pressure is applied at the source (not shown) lubricant admitted to the control fitting 68 will unseat the usual drip plug check valve (not shown), and flow into the longitudinal king pin bore 27'. Lubricant is normally stored in said bore since it cannot return past the check valve, so that as lubricant is admitted at the lower end of bore 27', some will overflow from the upper end thereof, which will flow in part between the king pin and the bushing 13 to lubricate the corersponding bearing surface and in part about the beveled end 37 of the bushing 13 to drain into the pipe 41'—41, for supplying the drag link bearing in manner, in part described above and more fully set forth in the parent application. Lubricant from the socket 67 flows to slot 71 to lubricate the thrust bearing and will also pass into bore 54', the lubricant from bore 54' passing through port 60 and maintaining a common level in the bore and about the lower end of the king pin. Lubricant at the level of the terminal 57 will overflow therethrough, and through pipe 56 to supply the bearing surface of the tie rod bearing.

In the present embodiment, as in the parent application, the tie rod pipe 56 may be of diameter sufficiently large to permit the flow of lubricant about any air therein whereby air-blocking is precluded.

To disassemble the construction, the king pin lock key 12, the screw plug 59' and the cover plate 36 are removed, the vehicle being supported on a jack. Screws 29' are now either loosened or removed, so that the split bushing 20 will relieve pressure on the king pin, which may now be driven out of place. The knuckle 17 can then be slipped off the axle, in which operation the thrust bearing 18—20 is carried as a unit with it. Since the pin 19 anchors the disk 18 to the knuckle, the skirt 22 prevents lateral separation of block 20 from disk 18, and the notch 21a permits free movement of block 20 past pin 21'. The thrust bearing can then be readily separated into its constituent parts. For assembly, the order of steps set forth is reversed. The lower bearings supplied by the drip plug in socket 67 are entirely free from any communication with the king pin bore 27' and the relief valve provided as a part of each of the drip plug fittings in the sockets 66 and 67 will act as check valve to prevent flow return.

In Figs. 4 and 5, is shown another embodiment more particularly used in connection with an Elliott axle, that is, an axle in which the clevis jaws 75 and 76 are a part of the axle beam, and in which the king pin 77 is rigidly secured to the knuckle 78, the ends of the king pin bearing in corresponding bushings 79 and 80, rigidly affixed in the respective axle clevis jaws. I have in this embodiment also shown a construction of substantially conventional design, in which space is afforded for a ball thrust bearing, which I replace by a plate thrust bearing as in the embodiment of Fig. 1, consisting of a disk 81 resting on the knuckle and keyer thereto by a pin 82 in a corresponding depression in the knuckle and a coacting thrust block 83 keyed by a pin 84 fixed in the axle clevis jaw 75 and extending into radial groove 84' in the thrust block, substantially as in the other embodiments. The block is of construction identical with that previously described, but is clamped about the upper bushing 79 which is a rigid part of the axle, rather than about the king pin, which in this construction, pivots with the knuckle. The arrangement of liquid-tight gasket 85 is similar to that previously described, except that it effects a tight joint to a bore 86 longitudinally through the upper bushing, which bushing is made of sufficient thickness to accommodate such bore. The king pin is formed with a trough 87 at its upper end and has a longitudinal bore 88 extending part of the length thereof. The king pin bore delivers lubricant to one of the knuckle control bearings, in this instance, illustratively the drag link. For this purpose, I have illustratively shown a special form of king pin locking key 89, which serves also as a duct for lubricant from the king pin to be admitted to the drag link. The key 89 in this instance, is formed as a plug, threaded into the knuckle, and having a beveled end 90 taper-fitted into a corresponding socket in the king pin. The plug 89 is formed with a longitudinal bore 91 and bushing 92 is threaded into the outer end thereof, for tightening a compression coupling 92' by which a lubricant-tight connection is effected from the plug 89 to a pipe 93 extending downward and along the drag link to the ball pivot stud 94 thereof. To deliver lubricant to the tie rod bearing 95, I have in this instance provided the upper bushing 79 with a longitudinal groove 96 at its outer periphery extending through the entire height thereof, and communicating with a hole 97 in the thrust disk 81, which hole is made arcuate to register with the bushing bore in all positions of steering adjustment of the knuckle. The hole 97 communicates with a short bore 98 aligned therewith, in the knuckle 78, which bore drains through a compression coupling terminal 99 similar to terminal 92—92', into a pipe 100 extending along the knuckle structure and delivering into the tie rod pivot stud 95. The construction of bores through the tie rod and drag link pivot studs are not shown in Fig. 4.

Inasmuch as the king pin locking plug is shown at a level no higher than that of the drag link bearing, the entire length of conduit 93 connected therebetween may be of small diameter, and the king pin bore 88 may be of relatively large diameter to permit the flow of lubricant therethrough about any air therein, air blocking being thereby prevented.

The king pin is preferably provided with a flat 101 along a substantial part of the length thereof through which lubricant can drain from the bushing 79 to lubricate the lower bushing 80.

In operation, lubricant admitted past the drip plug 68' which is rigid with the axle, will rise through bore 86 to the upper end of bushing 79. Some of the lubricant will drain into the trough 87 and through bore 88 into bore 91 in the lock plug 89, thence through conduit 93 to supply the drag link bearing 94. Lubricant will also flow through groove 96 downward along the upper bushing, part escaping through the minute space between the bushing and the disk to spread along the thrust bearing surface, between disk 81 and block 83, and along flat 101 to the bearing of the lower bushing 80, the rest passing through aperture 97 into knuckle bore 98 and thence by way of terminal 99 into pipe 100 to supply the tie rod bearing. The king pin being inclined as shown, trough 87 is made to protrude above the bushing 79, to assure correctness of division between bore 88 and groove 96, the upper end of said groove being at substantially the same level as the right or lowest part of the outer rim of trough 87. It is found that sufficiently accurate division of lubricant is obtained by the construction described, but if desired, the bores of one or both of the conduit lines 93 and 100 may have restriction pins therein to limit the lubricant delivered therethrough.

In all of the embodiments disclosed, it will be noted that the lubricant inlet for the knuckle, is affixed on a sustaining member therefor, disposed adjacent the king pin, lodged in a space between the knuckle and the axle, and keyed to the latter. Preferably the sustaining member serves also as a thrust bearing block, as shown.

In certain of the claims, I use the term "control bearing" as applying to one of the bearings of the knuckle. This term defines generically any of the bearings at the knuckle by which an operating adjustment on the knuckle or the wheel thereon is effected or transmitted from one to the other knuckle.

I claim—

1. In a motor vehicle, in combination, an axle, a knuckle carrying a pair of bearings, one of said members having a clevis straddling the other, a thrust bearing member sustaining the axle on the knuckle, a king pin rigid with the straddled member and bearing in the clevis jaws of the straddling member, a pair of lubricant inlets rigid with the axle and substantially contiguous to said thrust bearing, one of said inlets communicating with a bore extending therefrom axially upward along the king pin, a conduit in flow intercepting relationship with respect to lubricant through said bore and extending along the structure of the knuckle to one of the bearings thereof, the other inlet draining across the plane of the thrust bearing surface of the knuckle and a conduit along the structure of the knuckle conveying the lubricant therefrom to the other bearing.

2. The combination set forth in claim 1 in which the inlets comprise drip plug fittings in corresponding sockets formed in a thrust bearing block keyed with respect to the axle and in which a gasket in said thrust bearing block effects a lubricant-tight connection therefrom to the bore.

3. In a motor vehicle, in combination, an axle having a clevis, a knuckle straddled by said clevis and having bearing surfaces, a king pin therethrough and rigid therewith and extending into and bearing within said axle clevis, a thrust bearing sustaining the axle upon the knuckle having one element rigid with the axle and another rigid with the knuckle, an inlet fitting rigid with the element of said thrust bearing rigid with the axle, a lubricant passageway extending upward from said thrust bearing through a part of the structure rigid with said axle and draining in part to the upper king pin bearing surface and in part through a bore longitudinally through the king pin and a duct carried by said knuckle and conveying lubricant from said king pin bore to one of the knuckle bearing surfaces.

4. In a motor vehicle, in combination, an axle having a clevis, a knuckle straddled by said clevis and having bearing surfaces, a king pin through said knuckle held rigid therewith, bushings rigid with the jaws of said clevis, affording bearings for the ends of said king pin, a thrust bearing interposed between the upper clevis jaw and the knuckle, said thrust bearing comprising a bearing disk keyed to the knuckle, and a bearing block keyed to the clevis, a lubricant inlet fitting carried by the bearing block, a longitudinal bore through the upper king pin bushing supplied from said inlet, means effecting a lubricant-tight joint between said thrust block and said bore, a longitudinal bore through said king pin supplied through said bushing bore and a conduit supplied from said bore, carried by said knuckle and leading to a bearing surface of the knuckle.

5. In a motor vehicle, in combination, an axle having a clevis, a knuckle straddled by said clevis and having bearing surfaces, a king pin through said knuckle held rigid therewith, bushings rigid with said clevis affording bearings for said king pin, a thrust bearing interposed between the upper clevis jaw and the knuckle, said thrust bearing comprising a bearing disk keyed to the knuckle and a bearing block keyed to the clevis jaw, a lubricant inlet fitting carried by the bearing block, a longitudinal bore through the upper king pin bushing supplied from said inlet, a second longitudinal bore extending the height of said bushing and delivering through a port in said thrust bearing to a bore in the knuckle and a conduit carried by the knuckle conveying lubricant from said bore to a bearing surface of said knuckle.

6. In a motor vehicle, in combination, an axle having a clevis, a knuckle straddled by said clevis with a plurality of bearing surfaces, a king pin through said knuckle held rigid therewith, bushings rigid with the jaws of said clevis affording bearings for said king pin, a thrust bearing interposed between the upper clevis jaw and the knuckle comprising a bearing disk keyed to the knuckle and a bearing block keyed to the clevis jaw, a lubricant inlet fitting carried by the bearing block, a longitudinal bore through the upper king pin bushing supplied from said inlet, means effecting a lubricant-tight joint between said thrust block and said bore, a longitudinal bore through said king pin supplied from said bushing bore, a conduit supplied from said king pin bore, carried by said knuckle and leading to one of the bearing surfaces of the knuckle, a longitudinal passageway through the length of the bushing, a port through the thrust bearing communicating therewith and a pipe supplied from said port carried by the knuckle and extending to another bearing surface thereof.

7. In a motor vehicle, in combination, a clevised axle, a steering knuckle pivoted thereto and straddled by said clevis, an annular member serving as a lubricant inlet and interposed between said knuckle and said clevis, and a conduit system carried by said knuckle and supplied from said inlet annulus to convey lubricant to one or more of the knuckle bearings.

8. In a motor vehicle, in combination, an axle, a knuckle having a pivotal mount thereat, control bearings for the knuckle, a thrust bearing sustaining said axle upon said knuckle and including a member rigid with the axle and means for supplying lubricant to said control bearings comprising an inlet fitting carried by said thrust bearing member beyond the bearing surface, a passageway within parts of the structure rigid with the axle, leading upward from the thrust bearing and a plurality of flow dividing conduits in flow intercepting relationship with respect to the lubricant transmitted through said passageway leading along the structure of the knuckle to said control bearings.

9. In a motor vehicle of the type including an axle and a knuckle, one of said members having a clevis straddling the other, and a king pin affording a bearing with respect to the clevis and rigid with the straddled member, the jaws of said clevis being spaced by a distance greater than the width of the straddled member to afford room for a thrust bearing; the combination therewith of a thrust bearing comprising a pair of coacting members, one rigid with the knuckle and the other rigid with the axle, the latter member having substantial thickness, lubricant inlet means affixed laterally in said latter member, a longitudinal passageway extending from said inlet fitting upward through parts rigid with said axle and means in flow intercepting relationship with respect to lubricant through said passageway for lubricating the thrust bearing.

10. In a steering axle of the type including a beam, a knuckle coacting with the end thereof and having bearing surfaces, one of said members having a clevis straddling the other and a king pin rigid with the straddled member and affording a bearing surface at the ends thereof for the knuckle member, the clevis jaws being spaced by a distance materially greater than the interposed length of the straddled member, to afford room for a thrust bearing; the combination therewith of a thrust bearing including a bearing block rigid with the axle with an annular lip encircling the thrust bearing face, a lubricant inlet fitting affixed to the lateral face of said block, a passageway in the structure rigid with said axle terminating near the upper end of the knuckle receiving lubricant from said inlet and a conduit carried by the knuckle leading to bearing surfaces thereof in flow intercepting relationship with the lower end of said passageway.

11. In a steering axle of the type including a beam, a knuckle coacting with the end thereof and having bearing surfaces, one of said members having a clevis straddling the other, a king pin rigid with the straddled member and affording a bearing surface at the ends thereof for the knuckle member, the clevis jaws being spaced by a distance materially greater than the interposed length of the straddled member to afford room for a thrust bearing; the combination therewith of a thrust bearing including a plate rigid with the knuckle, a coacting block rigid with the axle, said block having an annular lip encircling the plate to render the bearing face substantially dust-tight, a lubricant inlet fitting affixed in the lateral surface of said block, said bearing block being also split and having a radial inlet passage for entry of lubricant, screws drawing the split parts together against a part rigid with the axle, a gasket about the inlet passage and at the inner end thereof compressed against said axle part, a passageway in structure rigid with said axle communicating with said inlet passage and terminating near the upper end of the knuckle, a conduit system carried by the knuckle leading to bearing surfaces thereof in flow intercepting relationship with the upper end of said passageway, one of said conduits communicating with an arcuate transverse groove at the bearing face of the thrust bearing.

12. In a motor vehicle, in combination, an axle, a knuckle having a pivot mount with respect thereto and having bearing surfaces, one of said members having a clevis, a thrust bearing between one of the jaws of said clevis and the other member, said thrust bearing including a thrust disk keyed to the knuckle and a coacting thrust block keyed with respect to the axle and means for conveying lubricant from the axle to the pivoted knuckle comprising a plurality of lubricant inlet fittings in the thrust block and passageways from said fitting through parts rigid with said block and disk respectively delivering to bearing surfaces of said knuckle.

13. In a motor vehicle, in combination, an axle, a knuckle having bearing surfaces, a king pin, a thrust bearing interposed between the axle and the knuckle including a bearing plate keyed to the knuckle and a bearing block coacting therewith and keyed to the axle, a lubricant inlet fitting secured in said bearing block and delivering into a bore longitudinally of and extending through the top of the king pin and a pipe in flow intercepting relationship with said bore extending generally downward along the structure of the knuckle to a bearing surface thereof said bore and said pipe being so arranged in respect to said inlet fitting that there is a continuously open passage from said fitting to said bearing.

14. In a steering axle of the type including a beam, a knuckle coacting with the end thereof and carrying control bearings, one of said members having a clevis straddling the other, a king pin rigid with the straddled member and affording a bearing surface at the ends thereof for the knuckle member, the clevis jaws being spaced by a distance materially greater than the interposed length of the straddled member to afford room for a thrust bearing; the combination therewith of a thrust bearing including a plate rigid with the knuckle, a block rigid with the axle, the block having an annular lip encircling the lower to render the construction substantially dust-tight, a plurality of lubricant inlet fittings affixed in the lateral face of said block, passageways in structure rigid with said axle and knuckle respectively and conduits in flow intercepting relationship to said passageways for delivering lubricant to the respective knuckle control bearings.

15. As an article of manufacture, a lubricated thrust bearing for a steering knuckle including a split annular block, means for holding together the two segments of the block and an annular bearing disk cooperating with a surface of said block, and having a plurality of sockets in the lateral surface of the block for lubricant inlet fittings, lateral bores communicating with the inner portions of said sockets, one of which extends entirely through one side of the block and the other of which only extends partially therethrough and a vertical bore through said block and said plate communicating with said partial bore.

16. As an article of manufacture, a lubricated thrust bearing for a steering knuckle including a split annular block with a radial boss along a diameter at right angles to the splitting diameter, means holding the two segments of the block together and an annular bearing disk cooperating with said block, and having a socket in said boss to receive a lubricant inlet fitting and a radial bore communicating with the inner portion of said socket passing through the annular disk and opening on the inner surface thereof.

17. As an article of manufacture, a lubricated thrust bearing for a steering knuckle including a split annular block, means holding the two segments of the block together and an annular bearing disk cooperating with said block, said block having a socket to receive a lubricant inlet fitting, a bore communicating with the inner portion of said socket and an arcuate slot in the disk in lubricant intercepting relationship with respect to said inlet socket.

18. In a motor vehicle of the type including an axle, a steering knuckle, a king pin fixed to one of said elements and a clevis fixed to the other of said elements, the jaws of which encircle and bear upon the ends of the king pin; the combination therewith of a lubricating installation comprising a lubricant inlet substantially below the top of the king pin, a substantially vertical passageway upwardly from said inlet along the outside of the king pin to the upper end thereof and another substantially vertical pasageway along the outside of the king pin spaced from the first mentioned passageway and in lubricant intercepting relationship to the first mentioned passageway across the top of the king pin.

19. In a motor vehicle of the type incuding an axle, a steering knuckle, a king pin fixed to one of said elements and a clevis fixed to the other of said elements, the jaws of which encircle and bear upon the ends of the king pin; the combination therewith of a lubricating installation comprising a pair of spaced vertical passageways along the outside of the king pin, an axial bore through the king pin and an inlet substantially below the top of the king pin in lubricant admitting relationship to one of said outside passageways and said other outside passageway and said king pin bore being in lubricant intercepting relationship to the first mentioned outside passageway.

20. In a motor vehicle of the type including an axle, a steering knuckle, a king pin fixed to one of said elements and a clevis fixed to the other of said elements, the jaws of which encircle and bear upon the ends of the king pin; the combination therewith of a lubricating installation comprising a pair of spaced substantially vertical passageways along the outside of the king pin through a structure rigid with the clevis, a pair of spaced substantially vertical passageways through the king pin structure, a passageway through the knuckle and an inlet admitting lubricant to one of the outside passageways, the other of said outside passageways and one of the king pin passageways being in flow intercepting relationship with respect to said inlet passageway and the other king pin and knuckle passageways being in flow intercepting relationship with respect to said second mentioned outside passageway.

21. In a motor vehicle of the type including an axle, a steering knuckle, a king pin fixed to one of said elements, a clevis fixed to the other of said elements, the jaws of which encircle and bear upon the ends of the king pin and a bushing between the upper end of the king pin and the corresponding encircling jaw of the clevis; the combination therewith of a lubricating installation comprising an axial bore through the king pin, passageways through the bushing parallel thereto, a bore through the knuckle structure and an inlet, one of said bushing passageways being adapted to receive lubricant from said inlet and supply it to the axial king pin bore and the other bushing passageway and the knuckle bore being adapted to receive lubricant from the second mentioned bushing passageway.

22. In a motor vehicle of the type including an axle, a stering knuckle, a king pin fixed to one of said elements, a clevis fixed to the other of said elements, the jaws of which encircle and bear upon the ends of the king pin and annular bearing members fixed respectively to the upper clevis jaw and the top of the knuckle structure; the combination therewith of a lubricating installation comprising an inlet bore through one of said annular members on one side of the king pin, a bore through the other of said annular members at the other side of the king pin and passageways through the knuckle structure establishing communication between said bores.

23. In a motor vehicle of the type including an axle, a knuckle, a king pin fixed to one of said elements and a clevis fixed to the other of said elements, the jaws of which encircle and bear upon the ends of the king pin; the combination therewith of a lubricating installation comprising a socketed annulus between the upper clevis jaw and the structure to which the king pin is fixed, a lubricant inlet fitting in said socket and a conduit system associated with said knuckle in lubricant intercepting relationship with said inlet fitting.

24. In a motor vehicle of the type including an axle, a knuckle having bearing surfaces, a king pin fixed to one of said elements and a clevis fixed to the other of said elements, the jaws of which encircle and bear upon the ends of the king pin; the combination therewith of a lubricating installation comprising a double socketed ring between said clevis jaws encircling the king pin, inlet fittings in said sockets and a conduit system in lubricant intercepting relationship therewith including two conduits respectively in communication with said fittings for the purpose of conducting lubricant to bearing surfaces associated with said knuckle.

25. In a motor vehicle of the type including an axle eye, a king pin fixed therein and protruding on either side thereof and a clevised knuckle having bearing surfaces, the jaws of which encircle and bear upon the protruding ends of the king pin; the combination therewith of an axial bore through the king pin from the upper portion of the lower protruding end to the upper end thereof, a parallel bore through the lower clevis jaw and separate inlet fittings for admitting lubricant to the bottom of said axial bore and to the top of said clevis bore positioned adjacent the lower end of the axle eye, said bores being adapted to supply lubricant to bearing surfaces associated with said knuckle.

26. In a motor vehicle of the type including an axle, a knuckle having bearing surfaces, a king pin fixed to one of said elements and an annular thrust bearing structure encircling the king pin, supporting the axle and the knuckle and having elements rigid with the axle and knuckle; the combination therewith of a lubricating installation comprising a lubricant inlet in the element of the thrust bearing rigid with the axle, a passageway through the knuckle leading to a bearing surface on the knuckle and a substantially unrestricted passageway leading from said inlet to said knuckle passageway.

Signed at New York in the county of New York and State of New York this 6th day of June A. D.

THOMAS R. THOMAS.